United States Patent [19]

Furtek

[11] Patent Number: 4,833,301

[45] Date of Patent: * May 23, 1989

[54] MULTI-ZONE THERMAL PROCESS SYSTEM UTILIZING NONFOCUSED INFRARED PANEL EMITTERS

[75] Inventor: Edward J. Furtek, Salisbury, Mass.

[73] Assignee: Vitronics Corporation, Newmarket, N.H.

[*] Notice: The portion of the term of this patent subsequent to Jan. 21, 2003 has been disclaimed.

[21] Appl. No.: 30,446

[22] Filed: Mar. 25, 1987

Related U.S. Application Data

[60] Continuation of Ser. No. 776,001, Sep. 13, 1985, Pat. No. 4,654,502, which is a division of Ser. No. 572,163, Jan. 18, 1984, Pat. No. 4,565,917.

[51] Int. Cl.$^4$ ............................................. H05B 3/62
[52] U.S. Cl. ................................................ 219/388
[58] Field of Search ............... 219/388, 354, 405, 411, 219/390; 432/148, 144, 150, 11

[56] References Cited

U.S. PATENT DOCUMENTS

| | | | |
|---|---|---|---|
| 11,303 | 2/1893 | Morford | 29/613 |
| 1,841,537 | 1/1932 | Kelleher | 338/237 |
| 1,937,319 | 11/1933 | Eastwood | 219/388 |
| 2,146,427 | 2/1939 | Hawkins | 219/388 |
| 2,284,078 | 5/1942 | Wiegand | 29/615 |
| 2,504,146 | 4/1950 | Mossin | 338/254 |
| 2,513,993 | 7/1950 | Burton | 219/473 |
| 2,629,162 | 2/1953 | Peck | 219/388 |
| 2,674,809 | 4/1954 | Meienhofer | 219/388 |
| 2,939,807 | 6/1960 | Needham | 219/345 |
| 3,031,739 | 5/1962 | Boggs | 29/613 |
| 3,060,300 | 10/1962 | Horner | 219/345 |
| 3,146,340 | 8/1964 | Dewey | 219/520 |
| 3,160,736 | 12/1964 | Catterson | 219/219 |
| 3,214,565 | 10/1965 | Hager | 219/345 |
| 3,471,682 | 10/1969 | Hisey | 219/388 |
| 3,564,207 | 2/1971 | Joeckel | 219/354 |
| 3,596,351 | 8/1971 | Tilton | 29/611 |
| 3,694,627 | 9/1972 | Blatchford | 219/543 |
| 3,697,728 | 10/1972 | Stirzenbecher | 219/548 |
| 3,756,489 | 9/1973 | Chartet | 228/43 |
| 3,805,024 | 4/1974 | Joeckel | 219/354 |
| 3,809,859 | 5/1974 | Wells | 219/345 |
| 3,956,612 | 5/1976 | Ballard | 219/388 |
| 4,005,979 | 2/1977 | Brock | 432/8 |
| 4,017,967 | 4/1977 | Wells | 29/611 |
| 4,245,613 | 1/1981 | Wells | 219/388 |
| 4,247,979 | 2/1981 | Eck | 29/611 |
| 4,310,745 | 1/1982 | Bender | 219/345 |
| 4,366,177 | 12/1982 | Wells | 219/388 |

FOREIGN PATENT DOCUMENTS

| | | | |
|---|---|---|---|
| 55-125011 | 9/1980 | Japan | 219/388 |
| 1581127 | 12/1980 | United Kingdom . | |

OTHER PUBLICATIONS

Hankins, W. C., Editor, "The Application of Electric Infra-Red Heating to Industrial Processes", 1981.
Hedinair brochure, "Conveyorised Reflow Soldering System", 1983.
Hedinair brochure, "Mesh Belt Conveyor Ovens", (date unknown).
Byrne, T. M., "Semiconductor Furnace", IBM Tech. Disc. Bull., vol. 16, No. 5, Oct. 1973, pp. 1621-1622.
Vitronics Corporation brochure, "Infrared Conveyor Dryer Oven" Model VTT-1236, (date unknown).
Vitronics Corp. brochure, "Infrared Conveyorized Solder Reflow Systems", (date unknown).
Hedinair brochure, "Oven Systems for the Electronics Industry", (date unknown).

*Primary Examiner*—Teresa J. Walberg
*Attorney, Agent, or Firm*—Wolf, Greenfield & Sacks

[57] ABSTRACT

A multi-zone thermal process system utilizing nonfocused infrared panel emitters. An insulated housing has a plurality of zones each having separate panel emitters which heat a product load traveling through the zone and in close proximity to said panel(s) at different peak wavelengths in each zone. The panel emitters emit infrared wavelengths in the middle and far regions. The temperature differences across each zone and between the panel and product are held to a minimum. A specific application of the system is for accomplishing reflow soldering of surface mount devices to printed circuit boards.

10 Claims, 3 Drawing Sheets

MULTI-ZONE THERMAL PROCESS SYSTEM UTILIZING NONFOCUSED INFRARED PANEL EMITTERS

This application is a continuation of application Ser. No. 06/776,001, filed Sept. 13, 1985, now U.S. Pat. No. 4,654,502 which is a division of application Ser. No. 572,163 filed Jan. 18, 1984, now U.S. Pat No. 4,565,917.

FIELD OF THE INVENTION

This invention relates generally to multi-zone thermal process systems utilizing nonfocused infrared panel emitters, and in one embodiment to a method and apparatus for soldering surface mounted devices to printed circuit boards.

BACKGROUND OF THE INVENTION

Rapid advances in the technology of printed circuits and consequent miniaturization have created a growing demand for appropriate mass soldering methods. More components are being concentrated within a printed circuit board than ever before, and due to the increased number of soldered joints and their corresponding close spacing, reliable mass soldering has become increasingly critical.

The conductive method, whereby component assemblies are heated on a "hot Plate," is a low-volume, high energy-consuming, difficult to control method of accomplishing solder reflow. The conductive method is ineffective in processing the latest in hybrid assemblies as well as being potentially damaging to temperature-sensitive assemblies.

The convective method involves directing high-velocity heated air at the assembly This process is slow and energy inefficient, imprecise, and also potentially damaging to heat-sensitive components because, like conductive methods, all the components reach the maximum temperature required to accomplish solder reflow.

Vapor phase, a relatively new method of accomplishing solder reflow, utilizes direct contact condensation heating. The assembly to be heated is immersed in an atmosphere of vapor generated by a pool of boiling fluorocarbonated liquid The vapor, at the boiling point of the liquid, envelopes the assembly and begins to condense, giving up its latent heat of vaporization and raising the temperature of the assembly to that of the boiling point of the liquid. This causes the solder to melt and reflow.

An advantage of the vapor phase method is temperature control specific to the boiling point of the liquid, such that over-heating is impossible However, temperatures above 253° C. are unobtainable because fluorocarbonated liquids have not yet been developed capable of boiling at higher temperatures Furthermore, production is limited to the specific temperature of the liquid, i.e., if one wants to process a product with a solder having a different reflow temperature, the liquid must be drained and new liquid with the required boiling point charged into the system. This results in down time and excess fluid cost. Successful processing of assemblies with more than one solder type or temperature requirement is virtually impossible without processing the assembly more than once through different liquids.

The simple fact that vapor phase heats by pure conduction, i.e., direct contact condensation, is a disadvantage once again because the entire assembly must be heated to the reflow temperature of the solder. Predrying of the solder paste is also necessary or solder spattering can result, and shifting/misalignment of components Early infrared conveyer ovens utilized focused tungsten filament lamps to accomplish surface bonding onto ceramic substrates. These types of ovens however were not successful in surface mounting to epoxy/glass or polyimide/glass printed circuit boards.

Focused emitters typically emit short wave infrared radiation in the near or middle infrared regions. The effect of this shortwave emission is twofold. First, the reflective and color-selective nature of these short wavelenths, along with the varied material geometries and thermal conductivities of the components and substrates, causes large $\triangledown$T's (differences in temperature) between component and substrate at reflow point. Large $\triangledown$T's can cause flux charring, charring of polymeric assemblies, and damage to temperature-sensitive components.

Secondly, energy consumption is high. Focused bulb-type emitters operate at temperatures up to 2,700° K. and use up to 1,000 watts each. Some systems use up to 60 bulbs A typical furnace utilizing focused infrared lamp emitters consists of a tunnel having a process area approximately 30 inches long and constructed with alumina/silica backup insulation, a firebrick inner shell, and an outer shell of steel. All of the lamps are arranged equidistantly above and below a belt with subsequent lamps being spaced horizontally closer than previous lamps in an attempt to obtain a controllable, sharp temperature rise or spike for optimum reflow conditions at a set belt speed.

SUMMARY OF THE INVENTION

It is a principal object of the invention to provide a multi-zone thermal process system using nonfocused infrared panel emitters Another object of the invention is to provide a method and apparatus for soldering surface mounted devices to printed circuit boards utilizing nonfocused infrared radiation panel emitters which emit in the middle and far infrared wavelengths.

Another object of the invention is to accomplish reflow soldering of surface mounted devices to printed circuit boards while maintaining a small $\triangledown$ between the device and the board.

Another object of the invention is to accomplish reflow soldering of surface mounted devices to printed circuit boards using a low energy consumption.

In one aspect, the invention is a multi-zone thermal process apparatus utilizing nonfocused infrared panel emitters. An insulated housing has a plurality of zones each having separate panel emitters which heat a product load traveling through the zone and in close proximity to the panel(s) with the panel emitters in each zone emitting infrared radiation of a different peak wavelength to selectively heat different components of the load The temperature variation across each zone is less than about 0.5° C and the infrared radiation is in the middle and far infrared regions The temperature difference between the component being heated and the panel emitting surface is from about 10 to about 20%.

In another aspect, the invention is a method and apparatus for accomplishing reflow soldering of surface mounted devices to printed circuit boards using nonfocused infrared panel emitters whereby the board is subjected to the solder reflow temperature for only a short period of time and the devices never reach the solder reflow temperature, but remain from about 3 to about 10° C. lower in temperature. The board, having devices and solder disposed therein, travels through five zones. In the first zone, panel emitter(s) at a temperature of about 450° C. selectively dry the solder and preheat the board to about 110° C. In the second zone, the flux volatiles are removed and the devices are allowed to catch up with the board temperature In the third zone, panel emitter(s) at a temperature of about 265° C. selectively heat the board to a temperature of about 150° C. In the fourth zone panel emitters at a temperature of about 220° C. selectively heat the devices up to the board temperature. In the fifth zone, panel emitter(s) at a temperature of about 290° C. heat the board and solder to the solder reflow temperature for a short period of time while the devices remain about 3° to about 10° C. cooler.

Other objects and advantages of the invention will be more fully understood from the accompanying drawings and the following description of several illustrative embodiments and the following claims It should be understood that terms such as "left," "right," "upper," and "lower" used herein are for convenience of description only, and are not used in any limiting sense.

DETAILED DESCRIPTION OF THE PREFERRED EMBODIMENTS

Figure 1:
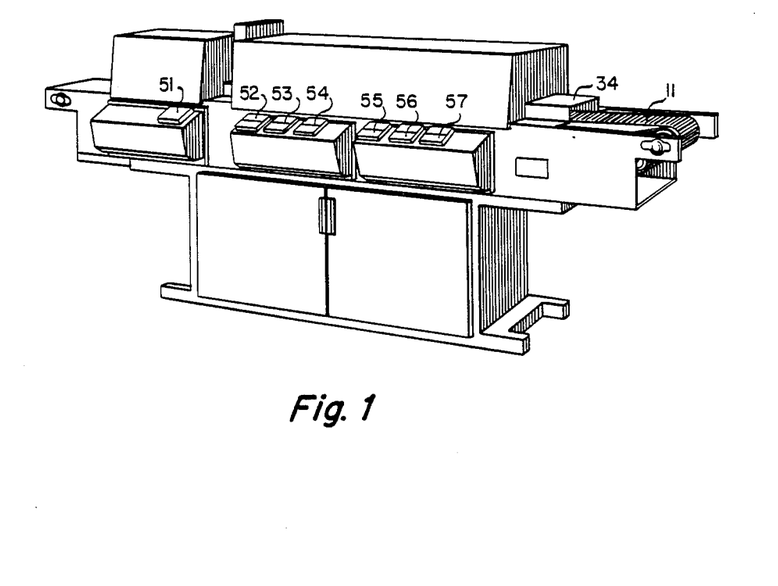
FIG. 1 is a perspective view of the apparatus of the invention.
Figure 2:
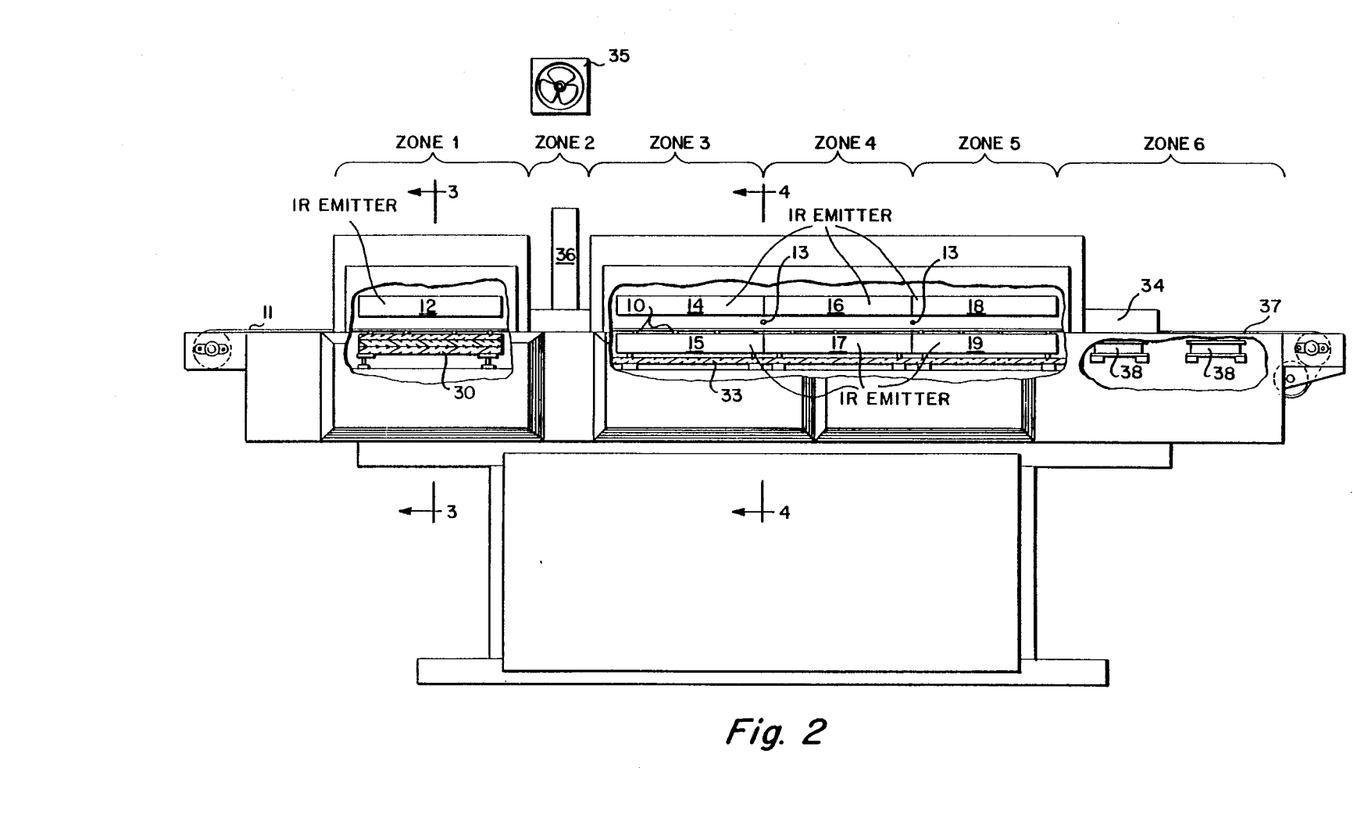
FIG. 2 is a plan and partial sectional view of the apparatus of the invention.
Figures 3, 4:
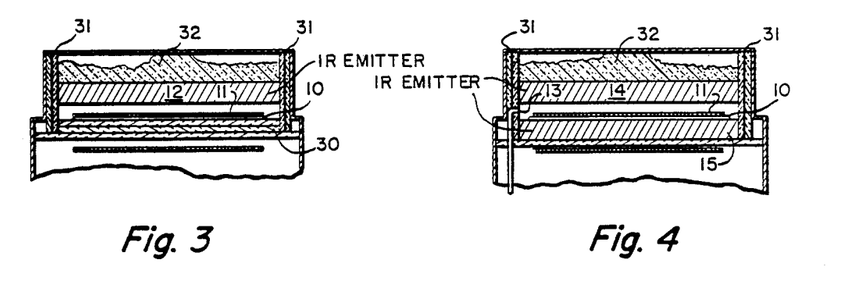
FIG. 3 is a cross-sectional view of zone 1 taken from lines 3—3 of FIG. 2.
FIG. 4 is a cross-sectional view of zone 3 taken from lines 4—4 of FIG. 2.

FIGS. 1 and 2 show a conveyorized infrared thermal process system of the invention. The system has along its length a plurality of zones, and is shown for example purposes only as having six zones. A conveyor, such as a belt 11, moves a product load through each of the zones.

ach thermal process zone 1, 3, 4, and 5 utilizes at one nonfocused infrared panel emitter for transferring radiant energy to the product load as it passes through the zone. Zone 1 has a top panel emitter 12. FIG. 3 is a cross-sectional view of zone 1. Zones 3, 4, and 5 each have a top panel emitter 14, 16, and 18, respectively, and a bottom panel emitter 15, 17, and 19, respectively FIG. 4 is a cross sectional view of zone 3; zones 4 and 5 are identical in cross section. Each panel emitter is individually microprocessor controlled via direct thermocouple feedback LED controllers 51–57, allowing true zone control, unlimited profileability, and programable heat spiking characteristics. Special atmospheres can be introduced into zones 3-5 through ports 13

Insulation surrounds each thermal process zone for maintaining the temperature within the zone. In zone 1, which has no bottom panel emitter, three layers of board insulation 30 may be used to insulate the bottom of the zone (see FIG. 3). A preferred board is 1.5 inch thick "hot board" made of alumina and silica and manufactured by The Carborundum Co., Niagara Falls, N.Y.. In zone 3, 4, and 5, each of which have a bottom panel emitter, one layer of board 33 may be used below the bottom panel emitter to insulate the bottom of the zone (see FIG. 4). The sides of zones 1, 3, 4, and 5, as shown in FIGS. 3 and 4, are preferably insulated with two layers of marinite 31, a higher silica content alumina silica board manufactured by 3M Co., St. Paul, Minn. Marinite is a good reflector of infrared radiation. The tops of zones 1, 3, 4, and 5, as shown in FIGS. 3 and 4, are preferably insulated with blanket insulation 32 of spun alumina. Zone 2 may be similarly insulated to protect the product load from the outside environment. Zone 6 has a cover 34 to protect the product load from the environment.

The panel emitters operate on the secondary emission principle. They contain resistive elements which disperse their infrared energy to the surrounding panel materials which radiate infrared energy evenly and uniformly over the entire process area and across a wide spectrum of colors and atomic structures. Every material, depending upon its color and atomic structure, and every object, depending upon its material and physical size, absorbs certain wavelengths of infrared radiation more readily than other wavelengths. Middle and far infrared is more readily absorbed by a greater number of materials than is the shorter wavelength near infrared radiation.

The advantages of panel emitters are that the infrared emitted is truly nonfocused and does not require special reflectors. Without the unnecessary intensity, special cooling systems are not needed, power consumption is less, and the medium wave infrared emitted boasts the dual properties of penetration and absorption. There are no hot and cold spots in the process area. Further, this system is energy efficient, requiring less power to operate than focused systems.

The noncontact nature of infrared processing has a critical edge over contact-type conductive systems. The sharp temperature rise and inherently rapid nature of infrared processing effectively minimizes the time period during which the product load is exposed to maximum temperature. The broad wavelength emission of the panel emitters allows the operator to vary peak wavelength to accommodate the different absorption characteristics of various materials, as well as varying intensity. In operation, the peak wavelength of infrared radiation in each zone can be precisely controlled to selectively heat desired components of the product load at a greater rate than other components. In this manner, there is more efficient energy transfer to materials of the product load, and greater protection of temperature-sensitive components within the product load.

Figure 5:
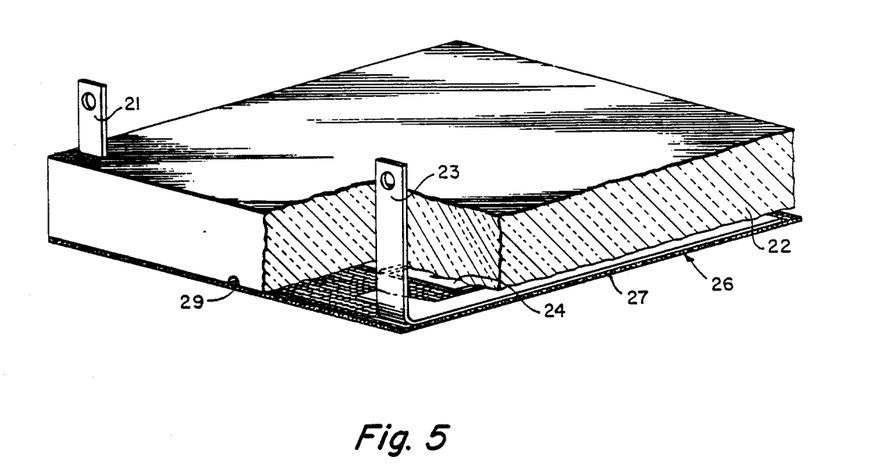
FIG. 5 is a perspective and partial sectional view of a panel emitter.

As shown in FIG. 5, the panel emitters used in the system of the invention have a primary emitter 24 consisting of a flat, coiled, or crimped metal wire or foil (resistive element) positioned between an insulating layer 22 and a secondary emitter 26. Terminals 21 and 23 connect the resistive element to a current source A preferred primary emitter is an etched foil of Inconel stainless steel having an emissivity factor of 0.9, a thickness of 0.003 inches, and a pattern covering of from about 60 to about 90% of the total foil area. This etched foil is described in commonly assigned U.S. Pat. Ser. No. 572,362, which is hereby incorporated by reference.

The insulating layer 22 is made from an electrically-insulating material and reflects infrared radiation to insure efficient emission by the panel in one direction only. A preferred insulating layer is the 1.50 inch thick "hot board" made of alumina and silica manufactured by The Carborundum Co., Niagara Falls, N.Y.

The secondary emitter 26 has an emitting surface 27 and is made from an electrically-insulating, high-emissivity material. Preferred secondary emitter materials include a woven alumina cloth made by 3M Co., St. Paul, Minn., consisting of 98% alumina and 2% organic material, approximately 0.039 inches thick, and having an emissivity factor of 0.9, and an alumina paper made by The Carborundum Co., Niagara Falls, N.Y., having approximately the same composition and thickness. Preferably the above described preferred panel components are bonded together by means of an alumina silica binder. This preferred panel is described in commonly assigned, copending U.S. Ser. No. 572,362. However, other known nonfocused infrared panel emitters may also be used in the systems of this invention.

In operation, the infrared energy emitted by the resistive element heats the secondary emitter material, which in turn emits diffused infrared energy uniformly across its entire emitting surface; hence, the secondary emission principle of operation. A temperature variation of less than 0.5° C. across the panel emitting surface is preferred.

The maximum operating life of these area source emitters is long, up to 8,000 hours, due primarily to the extensive protection afforded the element from oxidation and corrosion. These types of emitters require little or no maintenance and generally outlast all other components in the thermal process system. The panel emitters are nondegrading in intensity throughout their lifetime, and are unaffected by common line voltage variations.

A specific panel emitter having a peak temperature rating of 800° C. has been designed for accomplishing solder attachment of surface mounted devices to printed circuit boards. Applying Wein's displacement law, which states as follows:

$$\lambda(\text{Max. Emission}) = \frac{2897}{T \text{ source}}$$
(where $T$ is in degrees Kelvin and $\lambda$ is in microns)

it can be determined that at this temperature, the effective peak wavelength of emission would be 2.7µ. This type of infrared source emits most efficiently in the middle to far infrared range wavelengths Temperature sensing and maintenance is achieved via a closed-loop system. A thermocouple sensor rests in a clear quartz well (29 in FIG. 5) approximately 0.093 inches away from the backside of the resistive element and in the center of the panel The thermocouple is connected to a microprocessor-based PID (proportional integral derivative) controlling device which is programmed to a given panel's operating characteristics. The controller continually compensates around a setpoint for temperature drop and overshoot. It accomplishes this at a constant voltage value by allowing or stopping current flow into the resistive element as necessary via two relays. The controller also compensates for the nonlinear temperature indication characteristics of the type "K" thermocouples used. Thus, indicated temperature corresponds to actual primary emission temperature within ±0.5° C. By controlling the temperature of the primary emitter, the peak wavelength of the infrared radiation emitted by the panel can be controlled, thus controlling the peak wavelength in each respective zone.

The system utilizes a low mass, open mesh, low profile balance weave conveyor belt 11, the characteristics of which are calculated into the system so as not to interfere with emission The belt may be made of any low carbon stainless steel of about 20 to about 24 gauge and of about 0.187 to about 0.457 inches in height A preferred belt is made from 22 gauge 314 stainless steel and is 0.187 inches in height.

The belt 11 preferably travels over a series of support rods 10 which extend above the emitting surface of the lower panel emitters 15, 17, and 19. Quartz or stainless steel rods are used to withstand high temperatures. The rods preferably are made of Inconel steel and extend approximately 0.125 inches above the emitting surface. The rods enable the belt to run smoother and eliminate any wear on the surfaces of the lower panel emitters.

It is desirable to minimize the distance between the emitting surface of the panel emitter and the product load for greatest absorption and efficiency. Increasing the distance between the product load and the emitting surface requires an increase in the emitting surface temperature to obtain the same degree of radiation at the product load. Increasing the temperature at the emitting surface requires a shorter wavelength radiation which is more color selective and less readily absorbed The product load and the emitting surface should be positioned as close as possible but not so close as to allow conductive heating. A preferred range is from about 0.125 to 4 inches with an especially preferred range of about 0.125 to 1 inch.

It has been found that for certain thermal processes a furnace which efficiently emits infrared energy with an appropriate overall energy flux and in the proper absorption ranges of the materials to be processed will result in process optimization. For epoxy/glass, copper, polyimide/glass, and solder, the combined optimal peak absorption of radiant incident infrared energy is in the middle to far infrared wavelengths In contrast, focused emitters have a peak emission in the near or middle infrared region.

The conveyorized infrared thermal process system of the invention can be utilized to process any product load where it is desired to deliver a clean, noncontact, nonfocused infrared thermal energy uniformly over the entire process area, over a wide range of wavelengths and across a broad spectrum of colors and atomic structures, for a minimal time period at the process temperature, with a more efficient energy transfer to the material, and a greater protection of temperature-sensitive components Preferred uses include the reflow soldering of surface mounted devices to printed circuit boards, the curing of epoxy resins, reflow soldering of ceramic hybrids, lidsealing, and lead imbedment of semi-conductors.

A preferred embodiment of the invention for reflow soldering of surface mounted devices to printed circuit boards will now be described. The printed circuit boards are typically made of epoxy-glass, such as fire retardant 4(FR-4), or polyimide-glass. These boards typically degrade above temperatures of 225° C. The solder may be, for example, 60/40 (Sn/Pb), 63/37 (Sn/Pb), or 62/36/2 (Sn/Pb/Ag), all of which have a liquidus temperature (i.e., begin to melt) of about 190°

C. and having a peak reflow temperature of about 210–218° C. Thus, to effect reflow soldering without damaging the board, the solder must be allowed to reach a temperature of at least 210° C., but the board cannot reach a temperature of 225° C.

Another important parameter is the difference in temperature ( ▽T) between the surface mounted device and the printed circuit board. When processing microelectronic materials, shorter wavelength radiation is inappropriate because the reflective and color selective nature of these wavelengths, along with varied material geometries and conductivities, causes large ▽ T's between component and substrate at reflow points. Large ▽ T's can cause flux charring, charring of polymeric assemblies, and damage to temperature sensitive components. The variety of materials used today in microelectronics are most successfully processed in a variety of middle infrared wavelengths. Use of these wavelengths nets small ▽ T's between component and substrate. Using the method and apparatus of this invention, the component, regardless of geometry or color, has been found to be at least 3° C. to 10° C. cooler than the substrate at reflow point. Also, in serrated ceramic chip carrier assemblies, dye has been found to "see" a minimum of 10° C. less than the carrier peak temperature.

As shown in FIG 2, the board having devices and solder disposed thereon (i.e., the assembly) placed on belt 11 and sent through a first zone 1 to drive off specific flux volatiles in the solder paste in order to minimize solder balling during reflow. The emitting surface of panel emitter 12 is at a temperature of approximately 450° C., which corresponds to a peak infrared wavelength of approximately 3.5 μ in zone 1. The belt speed is set to enable the board to spend approximately 60 seconds in this preheat zone which enables the board to reach a first board temperature of approximately 110° C. when it exists the zone.

The board then travels through a second zone 2 comprising a vented transition area where the flux volatiles (e.g., alcohol) are removed so as not to be present at reflow and the components are brought up to approximately the first board temperature. A fan 35 is positioned over a vent 36 to maintain a slight draft. Air enters at both ends of the apparatus and exists through the vent. The assembly spends approximately 45 seconds in the transition zone, and the temperature of the board and devices at exit is approximately 105° C.

The board is then sent into a third zone 3 where the temperature of the emitting surfaces of top and bottom panel emitters 14 and 15 is approximately 265° C., corresponding to a peak infrared wavelength of approximately 3.8 μ for zone 3. Since the board and surrounding furnace insulation are now emitting radiation, the exact wavelength for the resistance element is difficult to ascertain. The assembly spends approximately 60 seconds in the third zone and the board is brought up to a second board temperature of approximately 150° C. at exit.

The board is then sent into a fourth zone 4 to enable the devices to catch up with the second board temperature. The emitting surfaces of the top and bottom panel emitters 16 and 17 are at approximately 220° C., which to a peak infrared wavelength of approximately 4μ for zone 4. The assembly spends approximately 60 seconds in the fourth zone and the temperature of the board and devices at exit is approximately 150° C.

The board is then sent into a fifth zone 5 to bring the temperature of the board up to a temperature of approximately 210° C., the devices up to approximately 195° C., and the solder up to approximately 210° C. for a period of time of from about 10 to about 20 seconds to cause the solder to flow. Because the devices are cooler than the board, the solder flows up the devices. The emitting surfaces of top and bottom panel emitters 18 and 19 are at approximately 290° C. which corresponds to a peak infrared wavelength of approximately 3.9 μ in the fifth zone. The board spends approximately 60 seconds in the fifth zone, but only about 10 to 20 seconds at 210° C. Thus, the board is at the solder reflow temperature for only a short period of time and the devices never reach the solder reflow temperature.

The board is then sent into a zone 6 where a "protected" temperature reduction is accomplished partly under cover 34 via a heat sinking plate 37 under belt 11 and air directed by fans 38.

The belt width may range from 6 to 22 inches, and the maximum temperature variation across the process area is ±1° C. to ±2.5° C, respectively An accurate and repeatable conveyor speed is maintained via a closed loop, self-compensating D.C. controlled circuit The belt wire used was 22 gauge 314 stainless steel, and the total belt thickness was 0.187 inch A preferred belt speed is between 10.5 and 12 inches per minute. This enables the board to spend the above designated time in each zone if zones 1, 3, 4, and 5 are each approximately 12 inches in length, and zone 2 is approximately 8 inches in length All of the panel emitters were 18 inches in width The distance between the emitting surface and the product load should be less than about 3 inches The distance between the top and bottom emitting surfaces in the preferred embodiment described was 1.5 inches Actual production testing with this furnace design has shown that optimal flux densities and proper absorption matching of materials has in fact been attained. There i more than adequate soldered joint strength, minimal to zero warping of board material, and no delamination whatsoever. Furthermore, no damage to temperature-sensitive components has been found. This is because the board and the solder rise in temperature at essentially equal rates, while the surface mounted components rarely attain maximum board/solder temperature.

Figure 6:
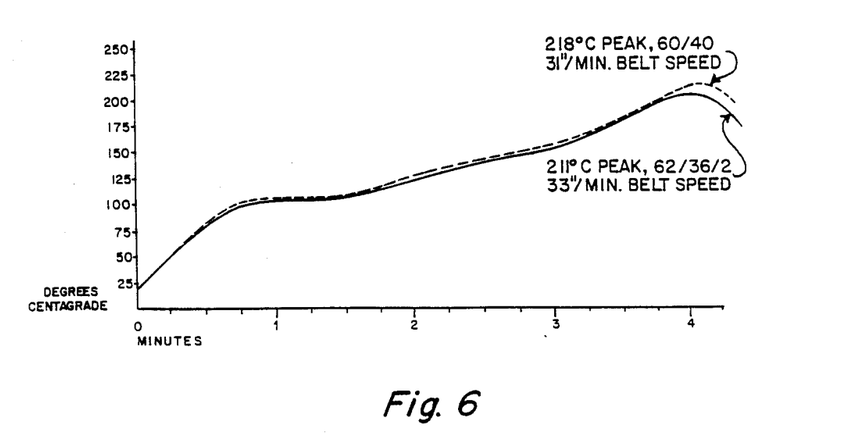
FIG. 6 is a graph of temperature profiles for solder reflow.

Furnace and actual profile parameters were obtained by embedding a type "K" thermocouple in the surface of a 3×5 inch FR-4, 0.052 inch thick, multilayer printed circuit board with half of the intended component mass and sending it through the furnace on a conveyor. This procedure yielded optimum soldered flow profiles for 62/36/2 (Sn/Pb/Ag) and 60/40 (Sn/Pb). FIG. 6 shows these profiles. The pre-heat zone 1 emission was at 3.95μ peak wavelength and the process zone (3–5) emissions ranged from peak wavelengths of 6.12 to 5.05μ.

Additional tests indicated that processing multilayer, boards of identical thickness but with larger surface areas did not measurably affect their actual temperature profiles within the acquired furnace profiles (8 × 10 inch to 10x16 inch, 0.052 inch thick multilayers). Decreasing total board thickness or switching to boards with no interlayers necessitated minor decreases in emitter temperatures to maintain the optimum conditions shown above.

These latter two observations are important in that they indicate a minimum of parameter changes necessary to process a wide range of printed circuit boards/surface mount assemblies. Additionally, single pass, double-sided surface mounting with matching solder types was accomplished on an identical 3×5 inch, 0.052 inch thick board as was used initially for developing profiles as well as solder attachment of surface mounts to single-sided polyimide/glass boards.

It has been found that careful consideration of thermal system design and emitter output with respect to product incident infrared absorption ranges and heat capacity insures optimal processing and results for surface mounting to printed circuit board materials. Epoxy/glass (FR-4), polyimide/glass, copper, and solder show the best combined incident infrared absorption in the middle to far infrared wavelengths. Panel emitter infrared furnaces developed for surface mounting to printed circuit boards emit these appropriate wavelengths most efficiently and at appropriate flux densities, and they can process these materials reliably with no deleterious effects

I claim:

1. A multi-zone thermal process apparatus utilizing infrared panel emitters for accomplishing reflow soldering of surface mounted devices to printed circuit boards, said apparatus comprising:
    an insulated housing;
    means for moving a printed circuit board with devices thereon through said housing;
    a first zone dispersed within said housing and having at least one infrared panel emitter with an infrared emitting surface spaced a predetermined distance from the printed circuit board;
    control means for tuning said emitter in said first zone to emit infrared radiation at a first predetermined peak wavelength;
    a second zone disposed within said housing and having at least one infrared panel emitter with an infrared emitting surface spaced a predetermined distance from the printed circuit board;
    second control means for tuning said emitter in said second zone to emit infrared radiation at a second predetermined peak wavelength, said second predetermined peak wavelength being greater than said first predetermined peak wavelength;
    a third zone disposed within said housing and having at least one infrared panel emitter with an infrared emitting surface spaced a predetermined distance from the printed circuit board; and
    third control means for tuning said emitter in said third zone to emit infrared radiation at a third predetermined peak wavelength, said third predetermined peak wavelength being less that said second predetermined peak wavelength.

2. Apparatus as recited in claim 1 wherein said predetermined distance is in the range of from about 0.125 inches to about 4 inches.

3. A multi-zone thermal process apparatus utilizing infrared panel emitters for accomplishing reflow soldering of surface mounted devices to printed circuit boards, said apparatus comprising:
    an insulated housing;
    means for moving at least one printed circuit board with devices thereon through said housing from a first end to a second end;
    a first zone disposed within said housing adjacent said first end and having one infrared panel emitter having an emitting surface for emitting infrared radiation at a first predetermined peak wavelength;
    a second zone disposed adjacent said first zone within said housing having means for cooling said board and said devices;
    a third zone disposed adjacent said second zone within said housing and having two confronting infrared panel emitters disposed on opposite sides of said moving means, each of said panel emitters having an emitting surface for emitting infrared radiation at a second predetermined peak wavelength;
    a fourth zone disposed adjacent said third zone within said housing and having two confronting infrared panel emitters disposed on opposite sides of said moving means, each of said panel emitters having an emitting surface for emitting infrared radiation at a third predetermined peak wavelength;
    a fifth zone disposed adjacent said fourth zone within said housing and having two confronting infrared panel emitters disposed on opposite sides of said moving means, each of said panel emitters having an emitting surface for emitting infrared radiation having a fourth predetermined peak wavelength; and
    a sixth zone disposed adjacent said fifth zone having second means for cooling said moving means and the board disposed thereon, said sixth zone being disposed adjacent said second end of said housing.

4. The apparatus of claim 3 further comprising means for controlling the peak wavelength emitted by the emitting surfaces for each of the panel emitters and each of said first, third, fourth and fifth zones.

5. The apparatus of claim 3 wherein the board and devices thereon are spaced from the emitting surfaces of each of said panel emitters in each of said zones a distance in the range of from about 0.125 inches to about 4 inches.

6. The apparatus of claim 3 further comprising rods for supporting said moving means, said rods being disposed approximately 0.125 inches above a lower one of the emitting surfaces of the infrared panel emitters in each of said third, fourth and fifth zones.

7. The apparatus of claim 3 wherein said first peak wavelength is approximately 3.5 microns.

8. The apparatus of claim 7 wherein said second peak wavelength is approximately 3.8 microns, said third peak wavelength is approximately 4 microns, and said fourth peak wavelength is approximately 3.9 microns.

9. A multi-zone thermal process apparatus using infrared panel emitters, said apparatus comprising:
    an insulated housing having a plurality of zones along its length;
    at least one infrared panel emitter disposed in each of said zones, each of said panel emitters having an emitting surface for emitting infrared radiation;
    means for moving a product load successively through each of said zones, said moving means being spaced a predetermined distance from each of said emitting surfaces; and
    means for selectively tuning each of said panel emitters in each of said zones to cause each of said panel emitters to selectively emit infrared radiation of a predetermined peak wavelength, said tuning means comprising:
        a primary emitter disposed in each of said panel emitters, each primary emitter comprising a metal foil having a pattern formed therein, said pattern covering about 60 percent to about 90 percent of the total foil area;

a thermalcouple disposed closely adjacent each of said primary emitters; and means for controlling the temperature of each of said primary emitters independently of one another to independently control the peak wavelength of the infrared radiation emitted from said emitting of each of said panel emitters.

10. The apparatus of claim 9 wherein said predetermined distance between the product load and each of said emitting surfaces is in the range of from about 0.125 inches to about 4 inches.

* * * * *

REEXAMINATION CERTIFICATE (4028th)

United States Patent [19]
Furtek

[11] B1 4,833,301
[45] Certificate Issued   *Apr. 4, 2000

[54] MULTI-ZONE THERMAL PROCESS SYSTEM UTILIZING NON-FOCUSED INFRARED PANEL EMITTERS

[75] Inventor: Edward J. Furtek, Salisbury, Mass.

[73] Assignee: Vitronics Corporation, Newmarket, N.H.

Reexamination Requests:
No. 90/003,429, May 11, 1994
No. 90/003,849, May 31, 1995

Reexamination Certificate for:
Patent No.: 4,833,301
Issued: May 23, 1989
Appl. No.: 07/030,446
Filed: Mar. 25, 1987

[ * ] Notice: This patent is subject to a terminal disclaimer.

Related U.S. Application Data

[60] Continuation of application No. 06/776,001, Sep. 13, 1985, Pat. No. 4,654,502, which is a division of application No. 06/572,163, Jan. 18, 1984, Pat. No. 4,565,917.

[51] Int. Cl.[7] .............................. H05B 3/02; B23K 31/02; F27B 9/36
[52] U.S. Cl. ........................................ 219/388; 228/180.1
[58] Field of Search ..................... 219/388, 405, 219/411; 228/180.1, 180.21, 180.22

[56] References Cited

U.S. PATENT DOCUMENTS

| | | | |
|---|---|---|---|
| 2,146,427 | 2/1939 | Hawkins | 219/35 |
| 3,515,330 | 6/1970 | Bronson et al. | 228/8 |
| 3,564,207 | 2/1971 | Joeckel | 219/544 |
| 3,583,063 | 6/1971 | Growney | 29/471.1 |

FOREIGN PATENT DOCUMENTS

| | | |
|---|---|---|
| 45-17152 | 7/1970 | Japan . |
| 54-9852 | 5/1979 | Japan . |
| 54-39909 | 11/1979 | Japan . |
| 60-7193 | 1/1985 | Japan . |

OTHER PUBLICATIONS

*Vitronics Model 1336 Solder Reflow Systems Brochure.*
*Vitronics IR Source Newsletter.*
*Circuit Manufacturing,* "IR Furnace Systems Solder Fusing and Other Applications", Aug. 1981.
Intex International Inc. *'J' Series Machine Brochure,* Jan. 1983.
Affidavit of Roger Meade, dated Dec. 22, 1993.
Affidavit of George Northover, dated Dec. 23, 1993.
*Tempress Model 830 Electronic Component Packaging Conveyor Furnace Sales Brochure,* 10 pages, 1980.
Vitronics Infrared Conveyorized Solder Reflow Systems Brochure, undated.
Vitronics "Some Products Processed in Vitronics' Systems" Brochure, undated.
Deposition of George Soderberg dated Jul. 7, 1995:
Exhibit 1, Notice of Deposition of George Soderberg.
Exhibit 2, Vitronics Brochure Entitled "Model VTT–1236, Infrared Conveyor Dryer/Oven".
Exhibit 3, Vitronics Brochure Entitled "Infrared Conveyorized Solder Reflow Systems".
Exhibit 4, Letter dated Sep. 8, 1992 with Attachments.
Exhibit 5, Vitronics Sales Package.

(List continued on next page.)

*Primary Examiner*—Joseph Pelham

[57] ABSTRACT

A multi-zone thermal process system utilizing non-focused infrared panel emitters. An insulated housing has a plurality of zones each having separate panel emitters which heat a product load traveling through the zone and in close proximity to said panel(s) at different peak wavelengths in each zone. The panel emitters emit infrared wavelengths in the middle and far regions. The temperature differences across each zone and between the panel and product are held to a minimum. A specific application of the system is for accomplishing reflow soldering of surface mount devices to printed circuit boards.

OTHER PUBLICATIONS

Exhibit 6, Circuit Manufacturing Magazine Article.
Exhibit 7, Letter dated Oct. 25, 1994.
Exhibit 7A, Draft.
Exhibit 8, Letter dated Sep. 29, 1994.
Exhibit 9, Memo dated Oct. 7, 1994.
Exhibit 10, Letter dated Oct. 26, 1994.
Exhibit 11, Declaration.
Exhibit 13, Document dated Nov. 17, 1994.
Exhibit 14, Vitronics Annual Report.
Exhibit 15, Affidavit.
Exhibit 16, Private Offering Memorandum.
Exhibit 17, Business Plan Sep. 15, 1982.
Exhibit 18, Securities and Exchange Commission Document.
Exhibit 21, Subpoena notes.
Solder creams and how to use them by C.A. MacKay, Alpha Metals Inc., Newark, N.J., Electronic Packaging and Production, Feb. 1981, pp. 116–133.

Forced Hot Air Fusing of Solder Plated Circuits by H.J. Scagnelli et al., Welding Journal, Oct. 1975, pp. 718–724.

Rapid Reflow–Soldering Constraints and Conveyor Furnace Design R.C. Alley et al., Watkins–Johnson Co., Scotts Valley, CA, Jan. 1972, Electronics Packaging and Production, pp. 58–65.

Design and Operation of Hot Air Soldering Facility by M.D. Weltha, Collins Radio Company, Cedar Rapids, Iowa, National Electronics Packaging Conference Proceedings, 1967, pp. 280–285.

Technology of Electronic Grade Solder, Taylor et al., Solid State Technology, Sep. 1981 pp. 127–135.

Solder Pastes for Hybrid Applications, Socolowski et al., Microelectronic Mfg. and Testing, Lake Pub. Corp. 1982.

Solder Pastes, Alphametals, Inc., product brochure Alpha, Solder creams for electronics, microelectronics mechanical assembly, Alaphametals, Inc., product brochure.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–10 is confirmed.

Claims 1 and 2 are cancelled.

* * * * *